United States Patent
Dwan et al.

(10) Patent No.: US 9,055,063 B2
(45) Date of Patent: Jun. 9, 2015

(54) MANAGING SHARED CONTENT WITH A CONTENT MANAGEMENT SYSTEM

(71) Applicant: Dropbox, Inc., San Francisco, CA (US)

(72) Inventors: Michael Dwan, San Francisco, CA (US); Jinpeng Ren, Mountain View, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 13/888,157

(22) Filed: May 6, 2013

(65) Prior Publication Data

US 2014/0282901 A1 Sep. 18, 2014

Related U.S. Application Data

(60) Provisional application No. 61/801,138, filed on Mar. 15, 2013.

(51) Int. Cl.
G06F 21/00 (2013.01)
H04L 29/06 (2006.01)

(52) U.S. Cl.
CPC ............. *H04L 63/0892* (2013.01); *H04L 63/08* (2013.01)

(58) Field of Classification Search
USPC ........................................................ 726/27
See application file for complete search history.

(56) References Cited

U.S. PATENT DOCUMENTS

| | | | |
|---|---|---|---|
| 8,060,434 B1 * | 11/2011 | Mauro et al. ................... 705/37 |
| 8,130,668 B2 * | 3/2012 | Agrawal et al. ............... 370/252 |
| 2004/0205168 A1 * | 10/2004 | Asher ........................... 709/220 |
| 2009/0100068 A1 | 4/2009 | Gauba et al. |
| 2010/0088292 A1 | 4/2010 | Tirpak et al. |
| 2010/0179943 A1 * | 7/2010 | Anand et al. .................. 707/646 |
| 2011/0164126 A1 * | 7/2011 | Ambor et al. ................... 348/65 |
| 2012/0110429 A1 | 5/2012 | Tzonis et al. |
| 2012/0324002 A1 * | 12/2012 | Chen ............................ 709/204 |

OTHER PUBLICATIONS

Tootoonchian, et al., "Lockr: Social Access Control for Web 2.0", WOSN'08, Aug. 18, 2008, Seattle, Washington, USA.
Guha, S., et al.,"ROCK: A Robust Clustering Algorithm for Categorical Attributes," Proceedings of the 15th International Conference on Data Engineering (ICDE '99), IEEE Computer Society, Washington, DC, USA, pp. 512-521 (1999).

* cited by examiner

*Primary Examiner* — Lisa Lewis
(74) *Attorney, Agent, or Firm* — Fenwick & West LLP

(57) ABSTRACT

Embodiments are provided for managing shared content with a content management system. In some embodiments, a request is received for a history of content shares for an authenticated account, at least one content share is retrieved for the authenticated account, the at least one content share having at least one shared item and at least one recipient identifier, information on the at least one content share on a user interface is displayed, and a request is received to modify the at least one content share and updating the at least one content share in response to the request.

18 Claims, 13 Drawing Sheets

| Content_Share_Table 200 | | | | | |
|---|---|---|---|---|---|
| sharer 202 | shared item 204 | recipient 206 | active 208 | viewed 210 | timestamp 212 |
| User #1 | Album | User #2 | 1 | 1 | 0 |
| User #2 | Lightweight Share 2 | User #3 | 0 | 0 | 0 |
| User #3 | Lightweight Share 3 | 3rd Party[User#3] | 1 | 1 | 0 |
| User #1 | Lightweight Share 1a | Link[User#4] | 1 | 1 | May 15, 2012 |
| User #1 | Lightweight Share 1b | User #4 | 1 | 0 | May 16, 2013 |

FIG. 2

MANAGING SHARED CONTENT WITH A CONTENT MANAGEMENT SYSTEM

CROSS-REFERENCE TO RELATED PROVISIONAL APPLICATION

This application claims the benefit of U.S. Provisional Patent Application No. 61/801,138 filed Mar. 15, 2013, the disclosure of which is incorporated herein by reference in its entirety.

FIELD OF THE INVENTION

Various embodiments relate generally to managing shared content with a content management system.

BACKGROUND

Photo sharing services allow users to share albums of photos with other users of the photo sharing service. Typically, a link to a web-accessible address, such as an uniform resource locator (URL) to the album stored with the photo sharing service is sent to selected email addresses, and the intended recipient must either log in to the service using their account or set up a new account to access the album associated with the URL. Once the link has been sent to the intended recipients, the user that sent the link to the album generally has no way to track or review what the user has shared with other users. Furthermore, the user has no visibility or control over what happens to the album that has been shared. For example, the user has no way of knowing whether the intended recipient has viewed the album and/or forwarded a copy of the URL to other users.

Accordingly, there is a need for improved sharing of content items to provide users with more visibility and control over content stored with a service.

SUMMARY

Embodiments are provided for managing shared content with a content management system. In some embodiments, a request is received for a history of content shares for an authenticated account, at least one content share is retrieved for the authenticated account, the at least one content share having at least one shared item and at least one recipient identifier, information on the at least one content share on a user interface is displayed, and a request is received to modify the at least one content share and updating the at least one content share in response to the request.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 2 is a schematic representation for managing shared content items with a content management system in accordance with some embodiments of the invention;

DETAILED DESCRIPTION OF THE DISCLOSURE

Figure 1:
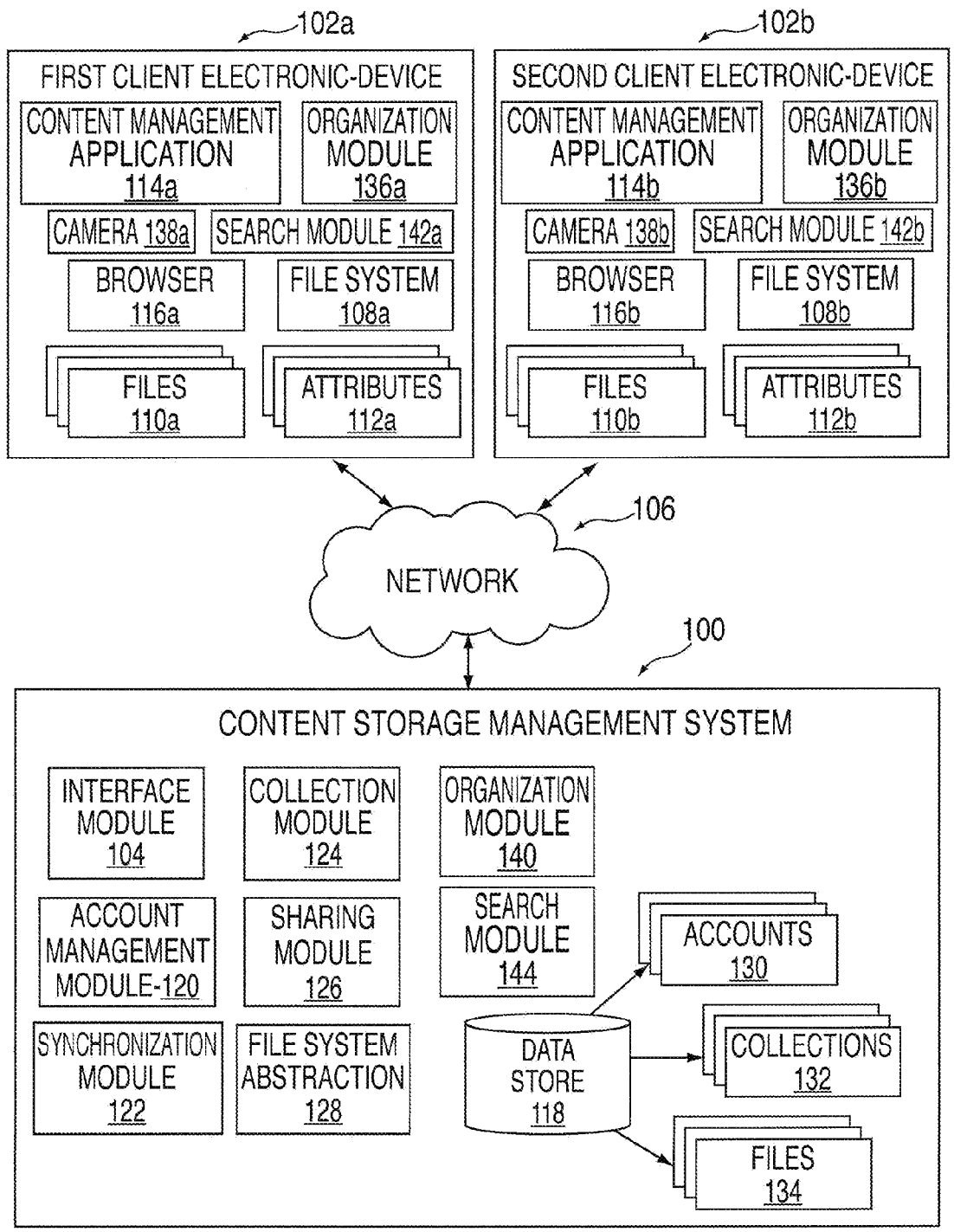
FIG. 1 is an exemplary system for managing shared content items with a content management system in accordance with some embodiments of the invention.

Methods, systems, and computer readable mediums for managing shared content with a content management system are provided. A sharing model/paradigm is described which provides greater visibility and control to a user of an authenticated account on shared items with the account and/or from the account. A log or history of content items shared from the authenticated account and with the authenticated account can be selectively displayed within a user interface for the authenticated account. The log, feed, or history may be requested by the user and/or pushed to the user to educate the user on content shared by the user and with the user.

A user of the authenticated account may control and review access to privately and public shared content items. Privately shared content items may be shared between authenticated accounts and/or particular email recipients that are queried to login or create an account with content management system. Publicly shared items may be posted to their public profile for the authenticated account and/or provided to third party applications. A user may also share content items using a link to a web-accessible address. The content management system may recognize the type of content share when access is requested using a particular URL for the type of share and enforce access rights in accordance with the type of share. Additionally, a user can set access rights prior to sending the content share and modify access rights to content items even after the content has been shared.

For purposes of description, "a content share" may be used broadly to encompass all mechanisms for sharing items with a recipient and a sharer using the content management system including, but not limited to, private and publicly sharing mechanisms and links to content. With the authenticated account, the user is able to (i) create a content share, (ii) review the content share, (iii) schedule a future content share, (iv) place a activation date and/or time limit on the content share, (v) modify or delete shared items of the content share, and (vi) modify or delete one or more recipients for the content share. The sharer is able to control access rights to shared items before, during, and after activation of the content share.

For purposes of description and simplicity, methods, systems and computer readable mediums will be described for a content storage and management service, and in particular, organization and presentation of content items (e.g., images). However, the terms "content storage service" and "content management system" are used herein to refer broadly to a variety of storage providers and management service providers as well as handling a wide variety of types of content, files, portions of files, and/or other types of data. Those with skill in the art will recognize that the methods, systems, and mediums described for organizing and presenting content items may be used for a variety of storage providers/services and types of content, files, portions of files, and/or other types of data.

FIG. 1 is an exemplary system for managing shared content items with a content management system in accordance with some embodiments of the invention. Elements in FIG. 1, including, but not limited to, first client electronic device 102a, second client electronic device 102b, and content management system 100 may communicate by sending and/or receiving data over network 106. Network 106 may be any network, combination of networks, or network devices that can carry data communication. For example, network 106 may be any one or any combination of LAN (local area network), WAN (wide area network), telephone network, wireless network, point-to point network, star network, token ring network, hub network, or any other configuration.

Network 106 can support any number of protocols, including but not limited to TCP/IP (Transfer Control Protocol and Internet Protocol), HTTP (Hypertext Transfer Protocol), WAP (wireless application protocol), etc. For example, first client electronic device 102a and second client electronic device 102b (collectively 102) may communicate with content management system 100 using TCP/IP, and, at a higher level, use browser 116 to communicate with a web server (not shown) at content management system 100 using HTTP. Examples of implementations of browser 116, include, but are not limited to, Google Inc. Chrome™ browser, Microsoft Internet Explorer®, Apple Safari®, Mozilla Firefox, and Opera Software Opera.

A variety of client electronic devices 102 can communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118). For example, client electronic device 102a may access file 110b stored remotely with data store 118 of content management system 100 and may or may not store file 110b locally within file system 108a on client electronic device 102a. Continuing with the example, client electronic device 102a may temporarily store file 110b within a cache (not shown) locally within client electronic device 102a, make revisions to file 110b, and the revisions to file 110b may be communicated and stored in data store 118 of content management system 100. Optionally, a local copy of the file 110a may be stored on client electronic device 102a.

In particular, client devices 102 may capture, record, and/or store content items, such as image files 110. Client devices 102 may have a camera 138 (e.g., 138a and 138b) to capture and record digital images and/or videos. For example, camera 138 may capture and record images and store metadata with the images. Metadata may include creation time, geolocation, orientation, rotation, title, and/or any other attributes or data relevant to the captured image. Metadata values may be stored as attribute 112 name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard.

An organization module 136 (e.g., 136a and 136b) may be used to organize content items (e.g., image files) into clusters, organize content items to provide samples of content items for display within user interfaces, and/or retrieve organized content items for presentation. The organization module 136 may utilize any clustering algorithm, including, but not limited to, algorithms implementing at least a portion of the ROCK algorithm and/or any other clustering algorithm. The ROCK algorithm is described in Guha, S., et al., "*ROCK: A Robust Clustering Algorithm for Categorical Attributes,*" Proceedings of the 15$^{th}$ International Conference on Data Engineering (ICDE '99), IEEE Computer Society, Washington, D.C., USA, pp. 512-521 (1999). and is hereby incorporated by reference in its entirety. The organization module 136 may be used to identify similar images for clusters in order to organize content items for presentation within user interfaces on devices 102 and content management system 100. Similarity rules may be defined to create one or more numeric representations embodying information on similarities between each of the content items in accordance with the similarity rules. The organization module 136 may use the numeric representation as a reference for similarity between content items to cluster the content items.

In some embodiments, content items may be organized into clusters to aid with retrieval of similar content items in response to search requests. For example, organization module 136a may identify first and second images are similar and may be group the images together in a cluster. Organization module 136a may process image files to determine clusters independently or in conjunction with counterpart organization module (e.g., 140 and/or 136b). In other embodiments, organization module 136a may only provide clusters identified with counterpart organization modules (e.g., 140 and/or 136b) for presentation. Continuing with the example, processing of image files to determine clusters may be an iterative process that is executed upon receipt of new content items and/or new similarity rules.

In some embodiments, a search module 142 on client device 102 is provided with counterpart search module 144 on content management system 144 to support search for content items. A search request may be received by search module 142 and/or 144 that requests a content item for a particular date, and the search may be handled by searching cluster markers of stored images. For example, cluster markers may indicate an approximate time or average time for the images stored with the cluster marker in some embodiments, and the marker may be used to speed the search and/or return the search results with the at least one image file of the cluster with particular cluster markers.

Files 110 managed by content management system 100 may be stored locally within file system 108 of respective devices 102 and/or stored remotely within data store 118 of content management system 100 (e.g., files 134 in data store 118). Content management system 100 may provide synchronization of files managed by content management system 100. Attributes 112 or other metadata may be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, an attribute 112a and 112b may be a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

A stand-alone content management application 114a and 114b (collectively 114), client application, and/or third-party application may be implemented to provide a user interface for a user to interact with content management system 100. Content management application 114 may expose the functionality provided with content management interface 104. Web browser 116a and 116b (collectively 116) may be used to display a web page front end for a client application that can provide content management 100 functionality exposed/provided with content management interface 104.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, and organization module 140. The content management service interface module 104 may expose the server-side or back end functionality/capabilities of content management system 100. For example, a counter-part user interface (e.g., stand-alone application, client application, etc.) on client electronic devices 102 may be implemented using content management service interface 104 to allow a user to perform functions offered by modules of content management system 100. In particular, content management system 100 may have an organization module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 can be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 124 can interact with any number of other modules of content management system 100.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

Content items (e.g., files 110) can be stored in data store 118. Data store 118 can be a storage device, multiple storage devices, or a server. Alternatively, data store 118 can be cloud storage provider or network storage accessible via one or more communications networks. Content management system 100 can hide the complexity and details from client devices 102 by using a file system abstraction 128 (e.g., a file system database abstraction layer) so that client devices 102 do not need to know exactly where the content items are being stored by the content management system 100. Embodiments can store the content items in the same folder hierarchy as they appear on client device 102. Alternatively, content management system 100 can store the content items in various orders, arrangements, and/or hierarchies. Content management system 100 can store the content items in a network accessible storage (SAN) device, in a redundant array of inexpensive disks (RAID), etc. Content management system 100 can store content items using one or more partition types, such as FAT, FAT32, NTFS, EXT2, EXT3, EXT4, ReiserFS, BTRFS, and so forth.

Data store 118 can also store metadata describing content items, content item types, and the relationship of content items to various accounts, folders, collections, or groups. The metadata for a content item can be stored as part of the content item or can be stored separately. Metadata can be store in an object-oriented database, a relational database, a file system, or any other collection of data. In one variation, each content item stored in data store 118 can be assigned a system-wide unique identifier.

Data store 118 can decrease the amount of storage space required by identifying duplicate files or duplicate chunks of files. Instead of storing multiple copies, data store 118 can store a single copy of a file 134 and then use a pointer or other mechanism to link the duplicates to the single copy. Similarly, data store 118 can store files 134 more efficiently, as well as provide the ability to undo operations, by using a file version control that tracks changes to files, different versions of files (including diverging version trees), and a change history. The change history can include a set of changes that, when applied to the original file version, produce the changed file version.

Content management system 100 can be configured to support automatic synchronization of content from one or more client devices 102. The synchronization can be platform independent. That is, the content can be synchronized across multiple client devices 102 of varying type, capabilities, operating systems, etc. For example, client device 102*a* can include client software, which synchronizes, via a synchronization module 122 at content management system 100, content in client device 102 file system 108 with the content in an associated user account. In some cases, the client software can synchronize any changes to content in a designated folder and its sub-folders, such as new, deleted, modified, copied, or moved files or folders. In one example of client software that integrates with an existing content management application, a user can manipulate content directly in a local folder, while a background process monitors the local folder for changes and synchronizes those changes to content management system 100. In some embodiments, a background process can identify content that has been updated at content management system 100 and synchronize those changes to the local folder. The client software can provide notifications of synchronization operations, and can provide indications of content statuses directly within the content management application. Sometimes client device 102 may not have a network connection available. In this scenario, the client software can monitor the linked folder for file changes and queue those changes for later synchronization to content management system 100 when a network connection is available. Similarly, a user can manually stop or pause synchronization with Content management system 100.

A user can also view or manipulate content via a web interface generated and served by user interface module 104. For example, the user can navigate in a web browser to a web address provided by content management system 100. Changes or updates to content in the data store 118 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 100 can include sharing module 126 for managing sharing content and/or collections of content publicly or privately. Sharing content publicly can include making the content item and/or the collection accessible from any computing device in network communication with content management system 100. Sharing content privately can include linking a content item and/or a collection in data store 118 with two or more user accounts so that each user account has access to the content item. In particular, the sharing module 126 can be used with the collections module 124 to allow sharing of a virtual collection with another user or user account.

The sharing can be performed in a platform independent manner. That is, the content can be shared across multiple client devices 102 of varying type, capabilities, operating systems, etc. The content can also be shared across varying types of user accounts.

In some embodiments, content management system 100 can be configured to maintain a content directory or a database table/entity for content items where each entry or row identifies the location of each content item in data store 118. In some embodiments, a unique or a nearly unique content identifier may be stored for each content item stored in the data store 118.

Metadata can be stored for each content item. For example, metadata can include a content path that can be used to identify the content item. The content path can include the name of the content item and a folder hierarchy associated with the content item (e.g., the path for storage locally within a client device 102). In another example, the content path can include a folder or path of folders in which the content item is placed as well as the name of the content item. Content management system 100 can use the content path to present the content items in the appropriate folder hierarchy in a user interface with a traditional hierarchy view. A content pointer that identifies the location of the content item in data store 118 can also be stored with the content identifier. For example, the content pointer can include the exact storage address of the content item in memory. In some embodiments, the content pointer can point to multiple locations, each of which contains a portion of the content item.

In addition to a content path and content pointer, a content item entry/database table row in a content item database entity can also include a user account identifier that identifies the user account that has access to the content item. In some embodiments, multiple user account identifiers can be associated with a single content entry indicating that the content item has shared access by the multiple user accounts.

To create a content share, sharing module 126 can be configured to add a content entry or database table row with a user account identifier for a content recipient, a user account identifier for a content sharer, and a content item to share thereby granting the recipient access to the content item, and a history of the share. Sharing module 126 can also be configured to remove and/or modify content shares by modifying or deleting a content entry or a database table rows to restrict access.

To share content publicly, sharing module 126 can be configured to generate a custom network address, such as a uniform resource locator (URL), which allows any web browser to access the content in content management system 100 with or without any authentication. To accomplish this, sharing module 126 can be configured to include content identification data in the generated URL, which can later be used to properly identify and return the requested content item. For example, sharing module 126 can be configured to include the user account identifier and the content path in the generated URL. Upon selection of the URL, the content identification data included in the URL can be transmitted to content management system 100 which can use the received content identification data to identify the appropriate content entry and return the content item associated with the content entry.

To share a virtual collection publicly, sharing module 126 can be configured to generate a custom network address, such as a uniform resource locator (URL), which allows any web browser to access the content in content management system 100 with or without any authentication. To accomplish this, sharing module 126 can be configured to include collection identification data in the generated URL, which can later be used to properly identify and return the requested content item. For example, sharing module 126 can be configured to include the user account identifier and the collection identifier in the generated URL. Upon selection of the URL, the content identification data included in the URL can be transmitted to content management system 100 which can use the received content identification data to identify the appropriate content entry or database row and return the content item associated with the content entry or database row.

In addition to generating the URL, sharing module 126 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 126 can be configured to change the value of the flag to 1 or true after generating a URL to the content item.

In some embodiments, sharing module 126 can also be configured to deactivate a generated URL. For example, each content entry can also include a URL active flag indicating whether the content should be returned in response to a request from the generated URL. For example, sharing module 126 can be configured to only return a content item requested by a generated link if the URL active flag is set to 1 or true. Changing the value of the URL active flag or Boolean value can easily restrict access to a content item or a collection for which a URL has been generated. This allows a user to restrict access to the shared content item without having to move the content item or delete the generated URL. Likewise, sharing module 126 can reactivate the URL by again changing the value of the URL active flag to 1 or true. A user can thus easily restore access to the content item without the need to generate a new URL.

FIG. 2 is a schematic representation for managing shared content items with a content management system in accordance with some embodiments of the invention. FIG. 2 provides an exemplary database entity for some embodiments of the invention. One or more database entities can be used to store content share data, information, and/or metadata within data store 118. In a relational database, an entity may be a database table or view. In an object database, the entity may map to an object class. The database table may be represented with columns that are fields for the database table and rows that represent the records of the database table. Each row or record in the database table may have one or more values for the database fields of the database table. Although examples provided throughout may refer to an entity as a database table, those skilled in the art will recognize that there are various ways an entity of a database design may be implemented.

Content share table 200 is a database table for content shares stored within data store 118. Content share table 200 has database fields depicted as follows: content sharer 202, shared item 204, recipient 206, active flag 208, viewed flag 210, and timestamp 212. Sharing module 126 may be used to associate a content sharer, one or more shared items, and a recipient to create a content share. For example, a new row may be created when a new content share is created and populated with values for content sharer 202, shared item 204, and recipient 206 fields.

A user with an authenticated account may request to view a particular shared item, and in response, a query is executed against the database to select content shares (e.g., a row in content share table 200) where shared item 204 field has the value for the particular shared item identifier and the recipient 206 field has the value for the user account identifier. The shared item identifier may be an identifier for an album, a virtual collection, a particular content item, a lightweight share, and/or any other identifier for one or more content items. An album may be a group of content items stored within a folder or directory on file system of client device 102 and/or stored remotely at content management system 100.

A lightweight share, akin to a virtual collection, may be a grouping of content identifiers that may be stored in various locations within file system of client device 102 and/or stored remotely at content management system 100. With the lightweight share identifier, all of the content items associated with the lightweight share identifier (e.g., stored with lightweight share identifier in data store) may be retrieved.

A sharing history, feed, and/or log of content shares may be created by, retrieving content shares for an authenticated account from data storage. For example, content shares may be retrieved from the database by executing a query against the database to retrieve all content shares where sharer field 202 has a value with the user account identifier and/or associated with the user account identifier (e.g., an account with a third party application). The results from executing the query to select all rows from content share table 200 where sharer field 202 has a value of or associated with the user account identifier may be used to create a share history of shared items. A sharer field 202 and a recipient field 206 may have values for a user account identifier, an account identifier associated with a third party application, an email address, and/or any other identifier for an account permitting shares.

An account identifier for a third party application, such as a social network, may specify the third party application as well as the user account with the third party application to which the content was shared. As shown with row 220, the recipient field 206 has a value "3rdParty[User #3]" to denote sharing with a third party application for account of "User #3." When a user shares content with a third party application (e.g., a social network, and/or any other web application), a signed URL may be posted to the social network and used by the recipient to retrieve the shared item. The content management system can track the accesses to the shared content by recognizing the signed URL when a request is made to access the shared content. As indicated in row 220, "User #3" shared item "Lightweight share 3" on a social network with their account as indicated with "3rdParty[User #3]." In some embodiments, the posting to a third party application, such as a social network, may be deemed the same as creating a public link and the same access rights may be enforced. For example, for a public link, shared content may not be downloaded from the when the signed URL is used to access the shared content.

A signed URL may be used for a link sent to a particular user, organization, and/or posted publicly. For example, as shown, a recipient field 206 may also be a link to a web-accessible address sent to particular user(s) as shown in row 218 with a link (e.g., "Link[User#1]") denoted as sent a link created for "User #1." To enable tracking of accesses to the shared content, hereagain, a signed URL may be used to retrieve the shared items. As shown, shared item in content share 218 has been accessed as indicated by the viewed field 210 set to "1"/True.

By way of example, to generate a history of shared content for account identifier of "User #1," a query may be executed against the database for the account identifier of "User #1," and three content shares at rows 214, 216, and 218 may be retrieved for "User #1." As shown in row 214 of content share table 200, sharer 202 with a user account identifier "User #1" has an active content share as denoted with a "1"/True value in active 208 field. The active content share of row 214 has a shared item 204 "album" for recipient 206 with an account identifier for "User #2." Content share 214 illustrates a private share to a recipient with an account identifier and/or email address. A signed URL may be used to request access to the shared item, and the content management system 100 may request that the user login and/or create an account with the content management system. The album has been viewed as denoted by viewed 210 flag set to "1"/True in row 214. The timestamp 212 may optionally be set to indicate a creation date, an activation date and/or activation date range for the content share. As shown, content share at row 214 does not currently have a timestamp field 212 value set.

Continuing with the shared history example for sharer 202 with account identifier "User #1", as shown with row 216 of content share table 200, sharer 202 with user account identifier for "User #1" has a shared item 204 of "Lightweight share 1b" that will be shared with recipient 206 with user account identifier "User #4." Content share in row 216 will be activated in the future in accordance with the activation date value for timestamp 212 (e.g., May 16, 2013). The shared item 204 of "Lightweight Share 1b" has currently not been viewed as indicated by "0"/False value for viewed 210 flag in row 216.

Continuing with the shared history example for sharer 202 with account identifier "User #1", as shown in row 220 of content share table 200, sharer 202 with user account identifier for "User #1" has a shared item 204 of "Lightweight share 3" that has been shared as a with a recipient 206 having an account identifier "User #4" as a link (e.g., as denoted with "Link[User #4]"). The link is active (e.g., "1"/True flag value in active 208) and has been viewed (e.g., "1"/True flag value in viewed 210). The link was activated in accordance with the timestamp 212 on "May 15, 2012."

Similarly, a share history for content shared with an authenticated account as a recipient may be retrieved by executing a query against the database to select all rows where recipient field 206 has a value for or associated with the user account identifier (e.g., user account with a third party application). Hereagain, the content shares indicate whether the content share is active, viewed, and a date associated with the content share.

Content share 222 in content share table 200 is a private share between sharer 202 "User #2" and recipient 206 "User #3." The content share is not active 208 (e.g., "0"/False) and not viewed 210 (e.g., "0"/False).

An index may be created for a database column or field of a database table to optimize the retrieval of data. In a preferred embodiment, use of the index may allow for retrieval of data without a full scan of a database table and/or a full scan of data accessible. Indexes may be created for the entire database column (e.g. for all data rows) and/or for a portion of the database column (e.g. a subset of data rows). For example, the index may be created for a subset of values for a column of a database table that are for a particular user account.

A database cursor may be used to keep track the current state for content items locally stored on a client device within the file system of the client device and/or cache of the client device. For example, the database cursor may point to a row in a database for a revision of a content share that is currently stored within a cache on a client device. With knowledge of the cached version, updates to the content shares can be sent to the client device.

Those with skill in the art will recognize that content share table 200 is meant to illustrate an exemplary storage mechanism where content shares and other metadata associated with content share may be stored and modified by the user with an authenticated account.

Figure 3:
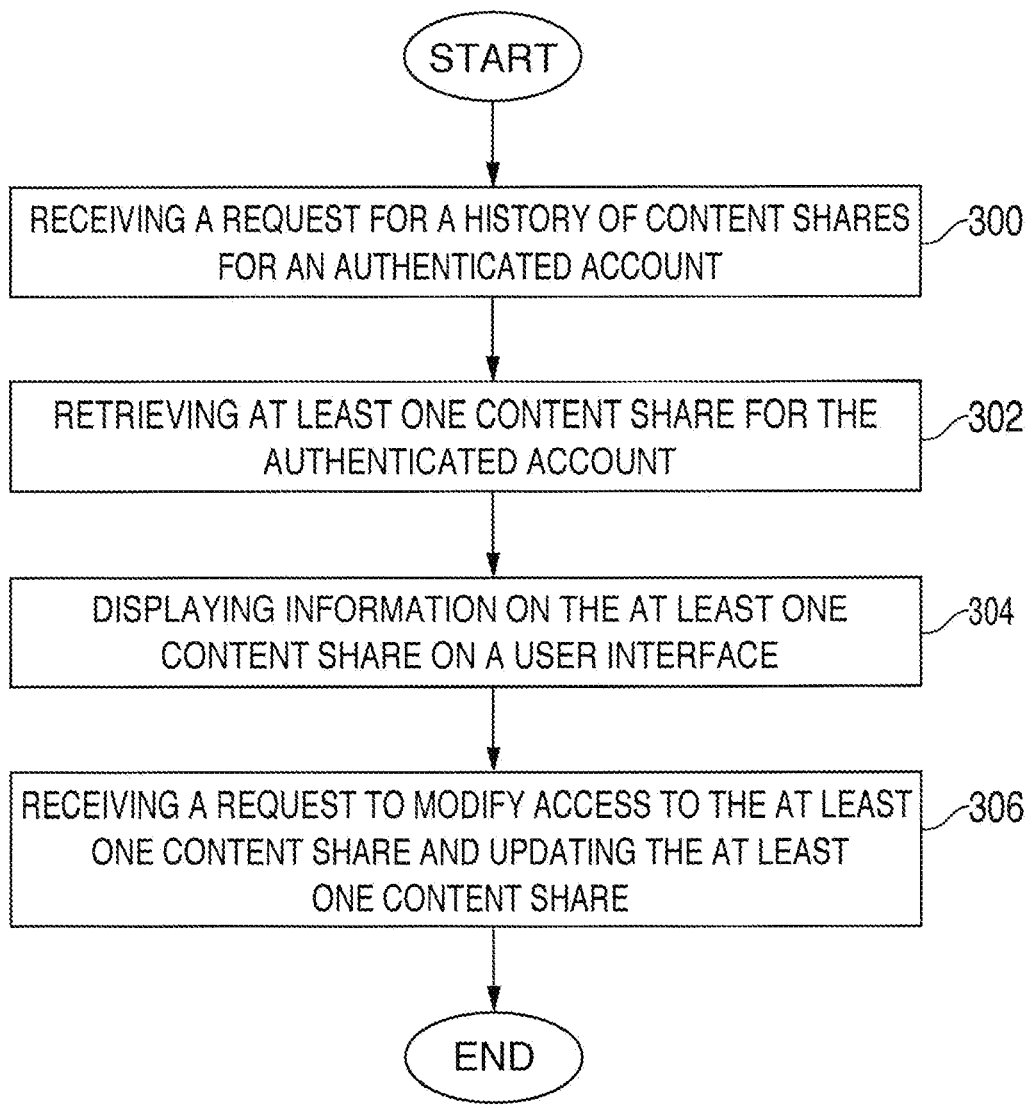
FIG. 3 is a flowchart for managing shared content items with a content management system in accordance with some embodiments of the invention.

FIG. 3 is a flowchart for managing shared content items with a content management system in accordance with some embodiments of the invention. FIG. 3 is a flowchart allowing a user to review their sharing history and selectively modify metadata associated with the content share. A request may be received for a history of content shares for an authenticated account (300). A user may pull the sharing history by actively requesting a sharing history through the user interface and/or the sharing history may be pushed to the user interface with a request initiated by content management system 100 and/or pushed to client device 102a at the request of client device 102b.

A history of activity for an authenticated account may provide insight as to what information concerning content shares may be desirable to push to a feed within the user interface of the authenticated account. For example, recent activity including, but not limited to communication with particular account users, third party applications, and/or email addresses through content management system 100, profile information, and/or any other metadata stored for the user may drive what information on content shares are provided on a feed. In this way information on content shares that are pertinent to a user of the authenticated account may be presented within the feed. In particular, when a user is viewing content shared from a particular user, a feed of content that the user shared with the particular user may be presented in the feed. Similarly, when a user is viewing content shared to a particular user, a feed of content that the particular user shared with the user's authenticated account may be displayed.

At least one content share may be retrieved for the authenticated account (302). Content shares for the authenticated account having sharer field value of the authenticated account identifier and/or associated with the authenticated user account identifier (e.g., shared from a third party application) may be retrieved from data storage. Content shares retrieved may be existing, past, and/or future content shares of content items. An entire history of content shares may be retrieved for an authenticated account including active and inactive content shares. Content shares may be listed in chronological order, based upon affinity to recipient, recent activity with recipient, by active and inactive status, alphabetical by recipient name, future and past content shares, and/or any other order.

Information on the at least one content share may be displayed on the user interface (304). Information may include metadata associated with the content share within data storage. Information may include, but is not limited to, recipient, content item(s) shared, whether the content share is active and able to be accessed, whether the content share has been viewed, a timestamp for the content share when it may expire and/or be activated, a number of content items shared, a representation for the content item (e.g., a thumbnail), and/or any other metadata associated with the content share. Shared content items may be shared albums and/or lightweight shares.

A request may be received to modify access to at least one content share (306). Access to the content share may be modified by making the content share inactive for a particular recipient, expire at a defined time for a particular recipient, altering, editing, and/or removing the shared content within the content share, and/or altering the date for allowing access to the content share. Content shares may be modified on a per recipient basis and/or a per shared item basis. For example, as shown in row 218 of content table 200 of FIG. 2, content items within a "Lightweight share 1a" for a recipient "User #4" using a link as denoted with "Link[User#4]" may be modified without altering the content items within "Lightweight share 1b" for a recipient "User #4" for content share within row 216. Although initially shared with the same content items, each lightweight share may have a separate lightweight share identifier. The lightweight share identifier may be stored within data storage as a group of content identifiers, and the content items of the shared item may be updated, modified, and/or deleted at the request of the user. Similarly, content shares of the same shared items (e.g., lightweight shares, albums, links, etc.) may be deactivated for a first user, but remain active for a second user.

Alternatively, content items, such as within lightweight shares 1a from content share 218 and 1b from content share 216 by way of example, may be modified on a shared content basis. For example, if a change is made to either lightweight share 1a and 1b, such as updated, and/or deleted, and the changes may be reflected in both lightweight shares 1a and 1b for all recipients.

Modifications to timestamps and active state may be done on a per content share basis. The timestamp may indicate when the content share was created, last updated, and/or when in the future the content share may be made available to a recipient. The user may also designate whether the content share state should be modified from either active to inactive and/or inactive to active (e.g., designated as True/"1" or False/ "0"). Any modifications to the content share may be updated in data storage (306).

Figure 4:
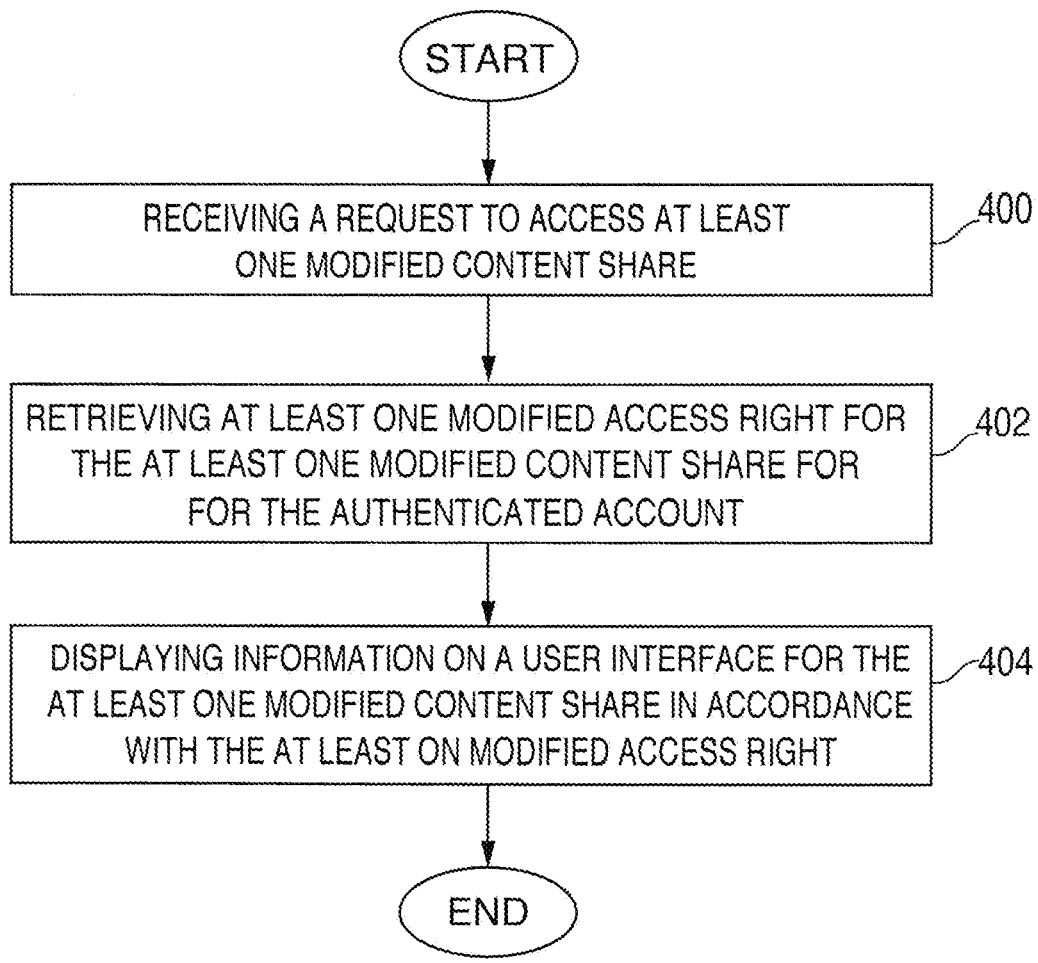
FIG. 4 is a flowchart for managing shared content items with a content management system in accordance with some embodiments of the invention.

FIG. 4 is a flowchart for managing shared content items with a content management system in accordance with some embodiments of the invention. A request may be received to access at least one content share (400). A user with an authenticated account may request to access a content share. The content shares where the recipient has a value for the authenticated account and/or associated with the account (e.g., an account with a third party or a link sent to the recipient).

At least one modified access right for the at least one content share may be retrieved (402). The content share may be an existing content share to the authenticated account that the recipient was previously able to view from their personal sharing history of content shared (e.g., inbox of content shared). The content share may be shared from another account with the content management system and/or from an account with a third party application.

The sharer of the content item may have modified the content share. The shared item for the content share and/or accessibility (e.g., active/inactive designation, timestamp) may have been modified. The content sharer may have modified access an access right for the at least one content share. For example, the sharer may have requested through the interface to modify the active field for the content share. In another example, the sharer may have modified the date for activation of the content share. Content items may have been updated, modified, and/or removed from the shared item (e.g., album, lightweight share). Continuing with the example, if the content item was updated, then the timestamp may be modified to the last modification date and the content share may be designated as not viewed on the user interface. In an embodiment, the sharer can select a future date for sharing content by setting a timestamp for future delivery.

Information on the modifications may be displayed on the user interface (404). For example, the shared content may no longer be accessible, and an indication that the content share is no longer accessible, or not yet accessible may be displayed on the user interface.

Figure 5:
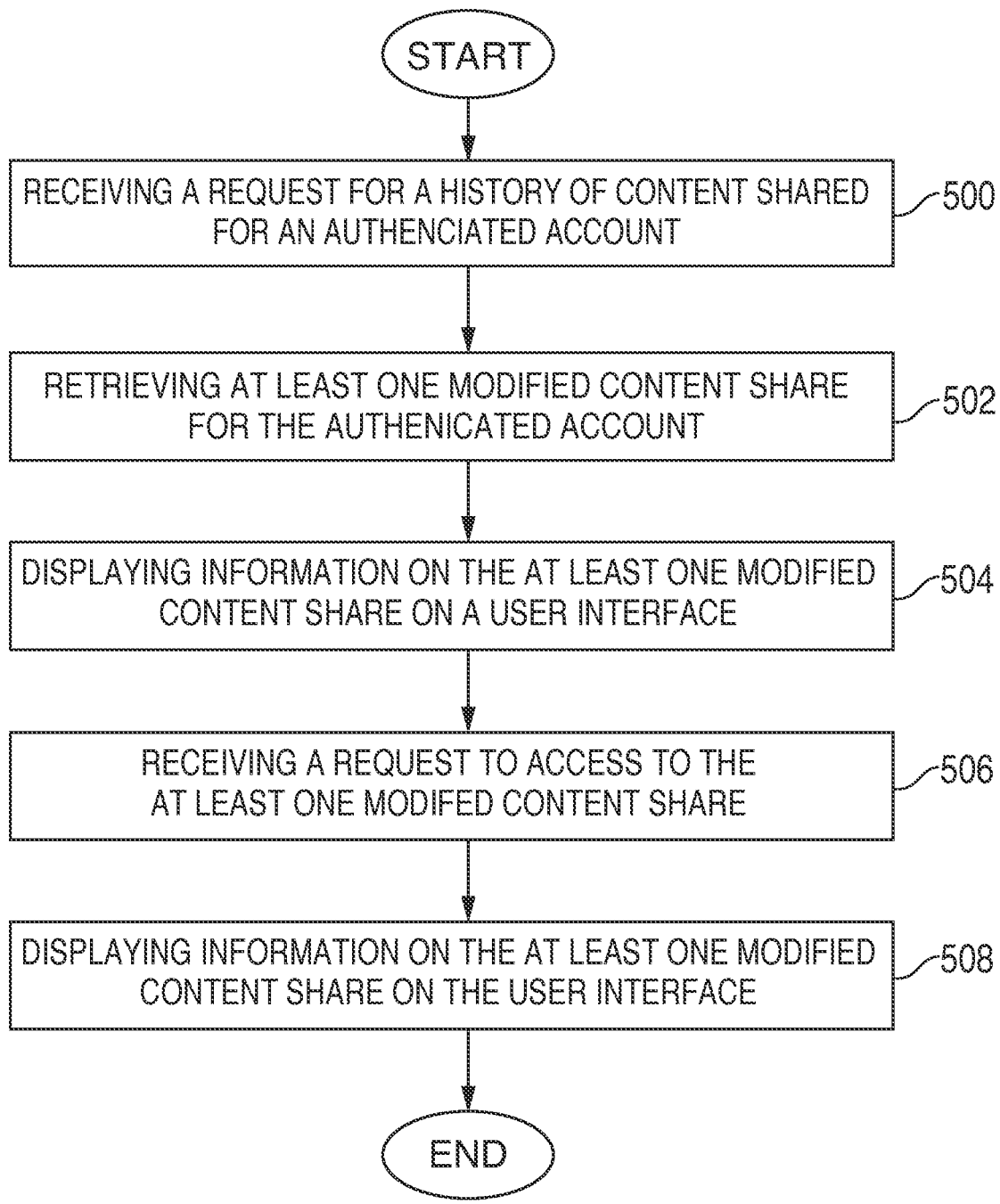
FIG. 5 is a flowchart for managing shared content items with a content management system in accordance with some embodiments of the invention.

FIG. 5 is a flowchart for managing shared content items with a content management system in accordance with some embodiments of the invention. A request may be received for display of a sharing history for an authenticated account (500). The request for content shared with a user may be requested directly by the user and/or pushed to the user from the content management system 100 in a feed.

At least one content share may be retrieved for the authenticated account from data storage (502). All content shares that are shared with the authenticated account (e.g., where the authenticated account is a recipient) and accessible (e.g., active and current date is past the timestamp date) may be displayed on the user interface (504). A placeholder may be displayed for content shares that will become available in the future. For example, a user may have changed the timestamp of the content share to a time in the future, but the content share information may still be displayed optionally with the date of the planned release of the shared content. A content sharer may continually edit content and release it for at a particular time and/or range of time.

Access to at least one content item may be requested by the user (506) through the user interface and the content items of the content share may be displayed in accordance with the at least one modification to the content share (506). For example, access to the content share may have been modified by the content sharer by either designating the content share as inactive and/or setting a future date for release. In another example, content items for the content share may have been modified, edited, and/or updated.

Figure 6:
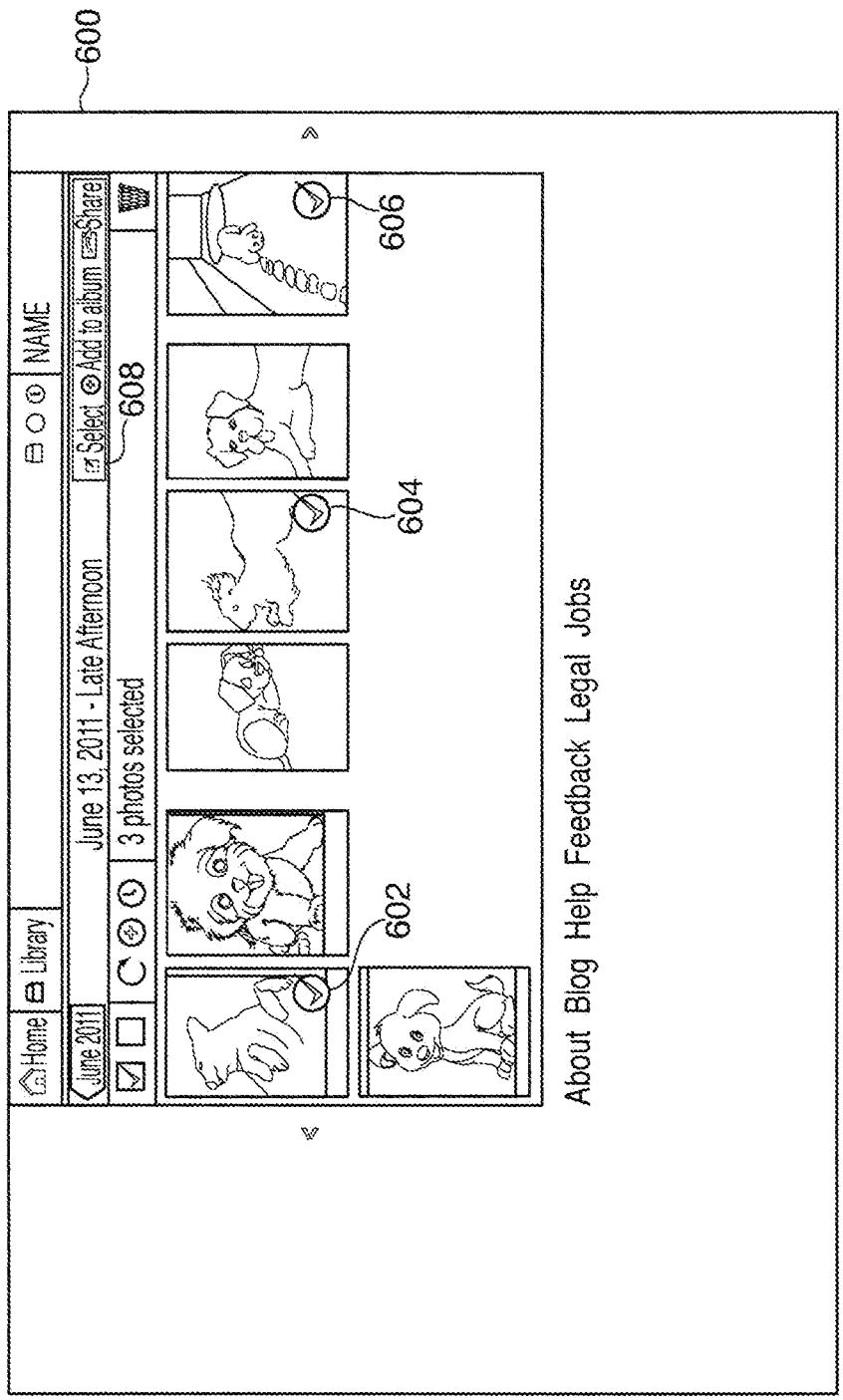
FIG. 6 illustrates an exemplary user interface for managing shared content items with a content management system in accordance with some embodiments of the invention.

FIG. 6 illustrates an exemplary user interface for managing shared content items with a content management system in accordance with some embodiments of the invention. As illustrated in user interface 600, a user may select content items 602, 604, and 606 to be shared in a lightweight share. With user interface control 608, the user may request that selected items 602, 604, and 606 be shared. Content item identifiers selected by the user may be stored with a lightweight share identifier in data storage.

Figure 7:
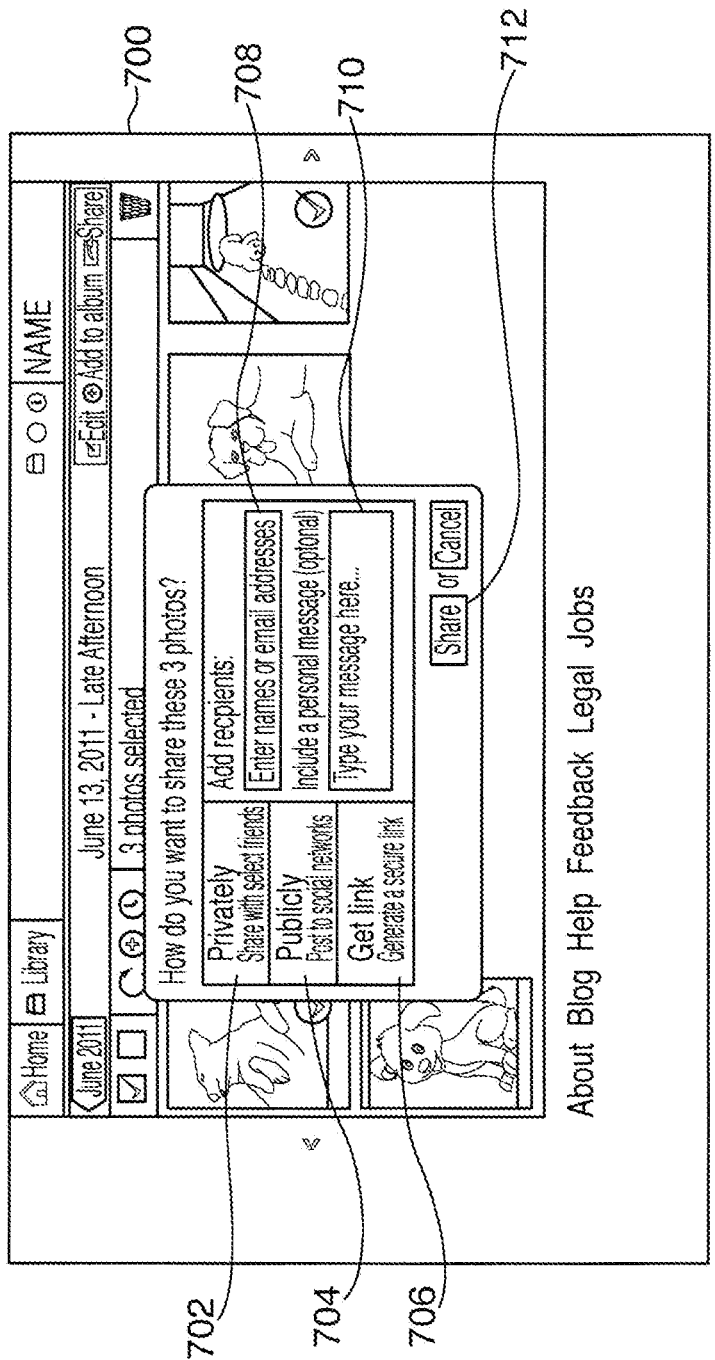
FIG. 7 illustrates an exemplary user interface for managing shared content items with a content management system in accordance with some embodiments of the invention.

FIG. 7 illustrates an exemplary user interface for managing shared content items with a content management system in accordance with some embodiments of the invention. As shown in user interface 700, the user may indicate whether to create a private share to a recipient 702, a public share to a third party application 704, and/or to generate a link for a recipient 706. The user may provide user names and/or email addresses in the text box entry 708 on user interface 700, and create the content share with user control 712.

User names previously submitted to the content management system 100 by the user may already have account identifiers and/or email addresses associated with the user names in data storage. User names and email addresses may be sorted by the affinity and/or relationship to the user. For example, user names and addresses that may have more recently submitted by the user to the content management system 100 for sharing content may have a stronger affinity and/or relationship established with the user according to the content management system 100. User names and address may be displayed on a drop down selection list on the user interface, and the user names and addresses will appear first or earlier on a list for selection than user names and addresses with less of an affinity or relationship to the user.

Figure 8:
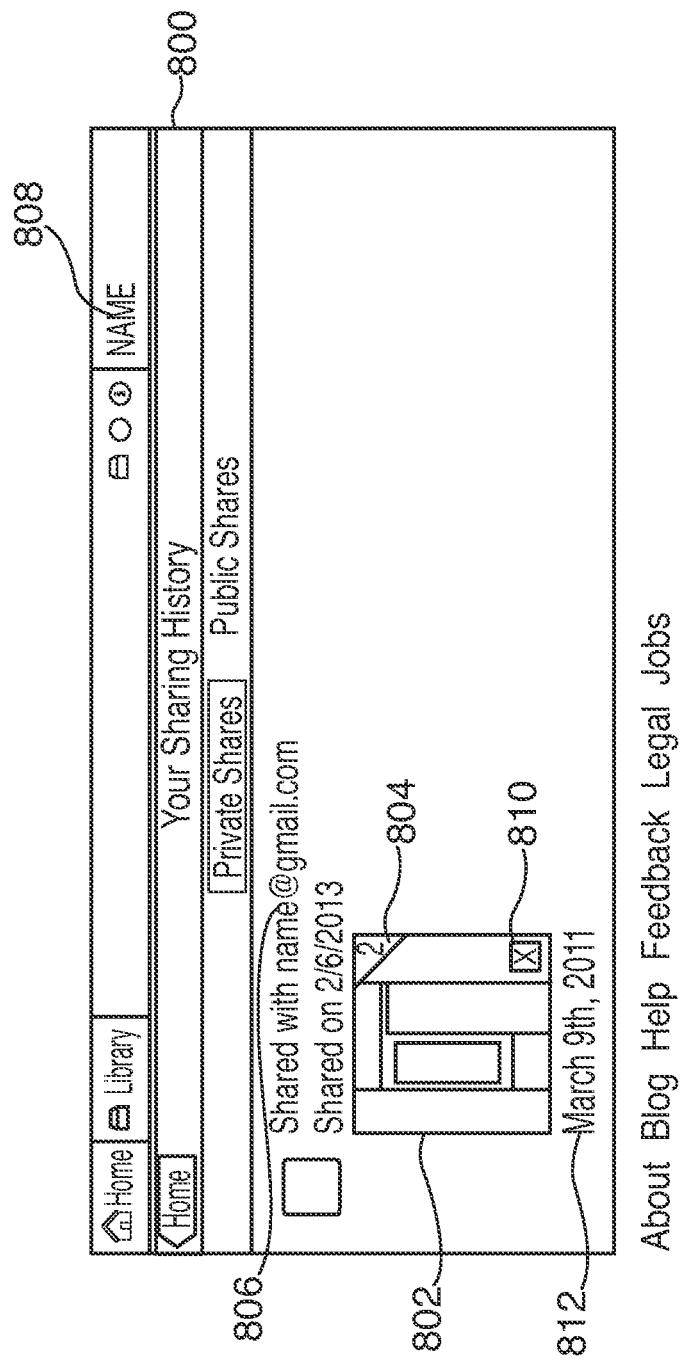
FIG. 8 illustrates an exemplary user interface for managing shared content items with a content management system in accordance with some embodiments of the invention.

FIG. 8 illustrates an exemplary user interface for managing shared content items with a content management system in accordance with some embodiments of the invention. FIG. 8 illustrates user interface 800 with a private sharing history for a user with name 808. As shown, a private content share 802 with two content items as designated with "2" at 804 is listed within the private sharing history on user interface 800 for a user with name 808. Content share 802 was shared with a user with the provided email address name@mail.com. A user may modify the content share to be inactive by selecting user control 810. A user may modify the time associated with the content share by selecting the date for editing, and a menu for editing the date may be displayed.

Figure 9:
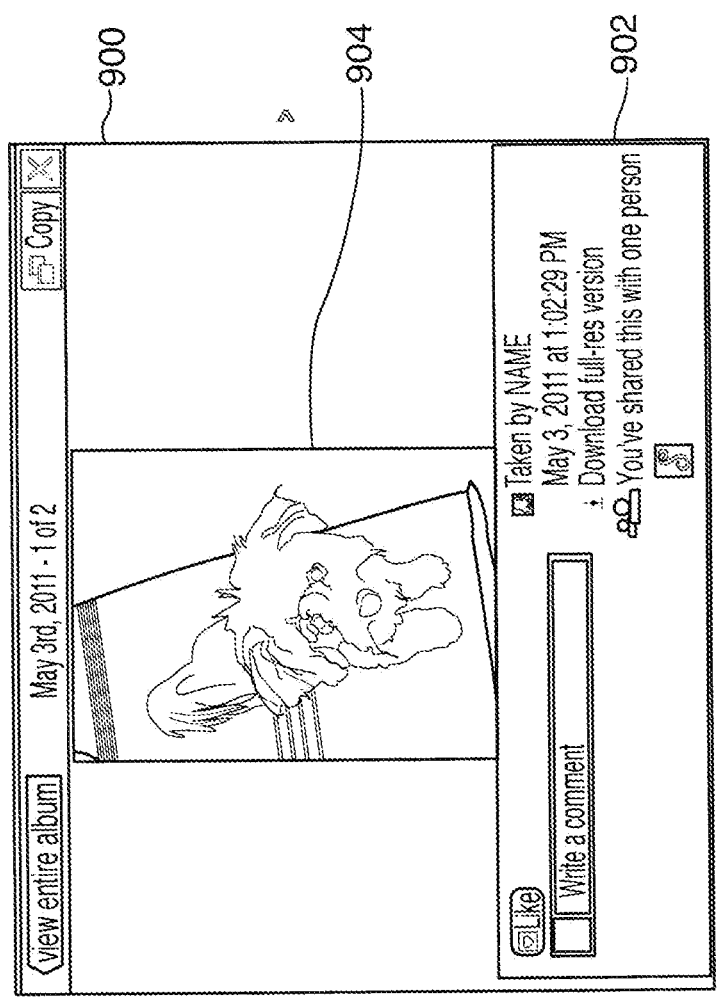
FIG. 9 illustrates an exemplary user interface for managing shared content items with a content management system in accordance with some embodiments of the invention.

FIG. 9 illustrates an exemplary user interface for managing shared content items with a content management system in accordance with some embodiments of the invention. As illustrated in user interface 900, each content item 904 may be displayed with a sharing history (e.g., "You've selected this with one person") and control 902 for the particular content item 904. The user may select the control 902 and a sharing history of all recipients of the particular content item may be displayed.

Figure 10:
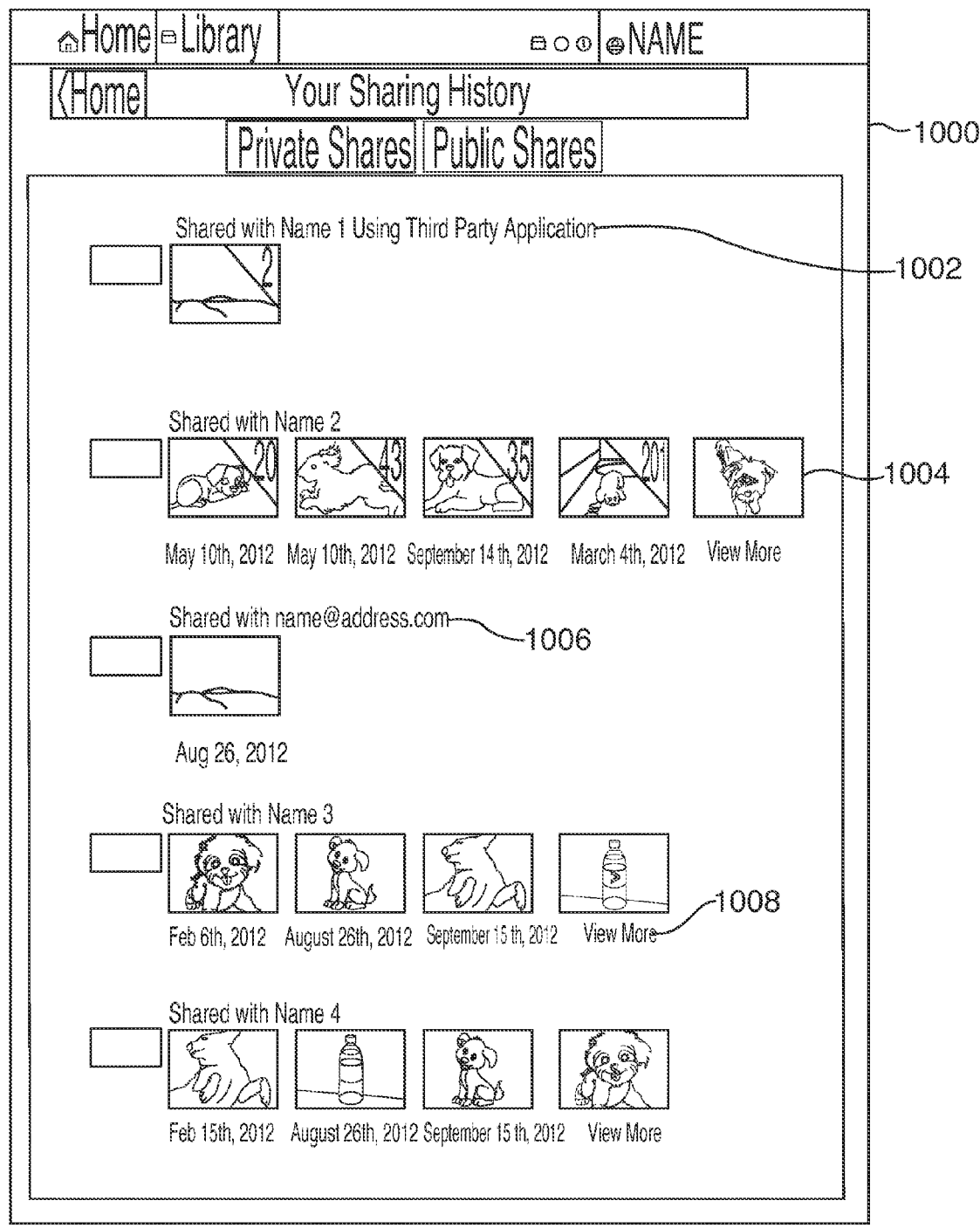
FIG. 10 illustrates an exemplary user interface for managing shared content items with a content management system in accordance with some embodiments of the invention.

FIG. 10 illustrates an exemplary user interface for managing shared content items with a content management system in accordance with some embodiments of the invention. User interface 1000 provides a sharing history of private shares using a third party application 1002 (e.g., by sharing with a particular user with an account with a third party application), email address 1006, and/or user account 1006 with the content management system 100. User interface control 1008 allows the user to view more content shared with "Alt Name."

Figure 11:
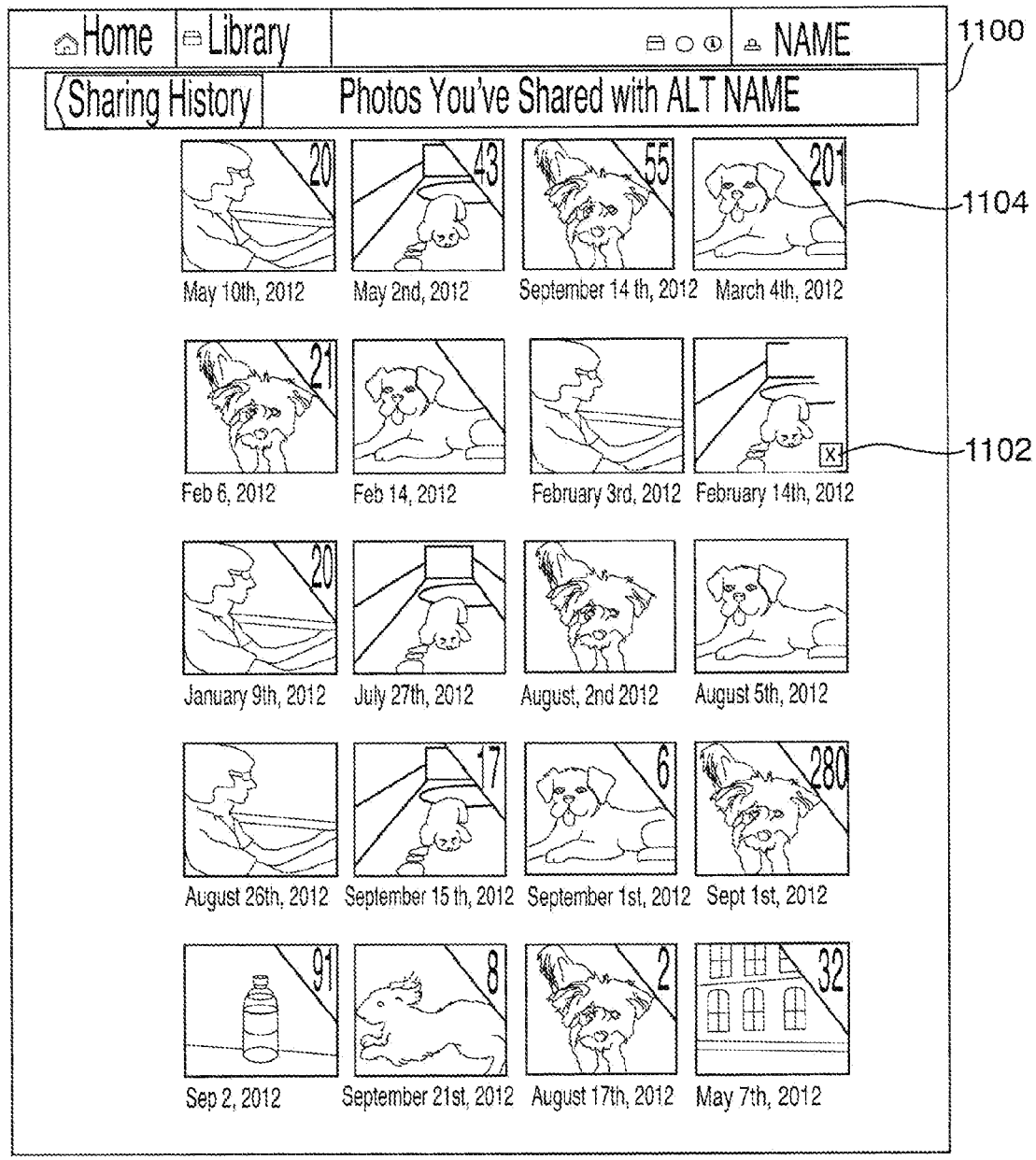
FIG. 11 illustrates an exemplary user interface for managing shared content items with a content management system in accordance with some embodiments of the invention.

FIG. 11 illustrates an exemplary user interface for sharing content items with a content management system in accordance with some embodiments of the invention. As illustrated with user interface 1100, a user may select a particular user "Alt Name" (e.g., by selecting link 1008 from user interface 1000 in FIG. 10) to view more content shares for the particular user. By selecting user control 1102, a user can indicate that the content share for the particular content item (e.g., lightweight share of one image) should be inactive. By selecting user interface control 1104, a user can select individual content items within the album and/or lightweight share to remove and/or alter access rights.

Figure 12:
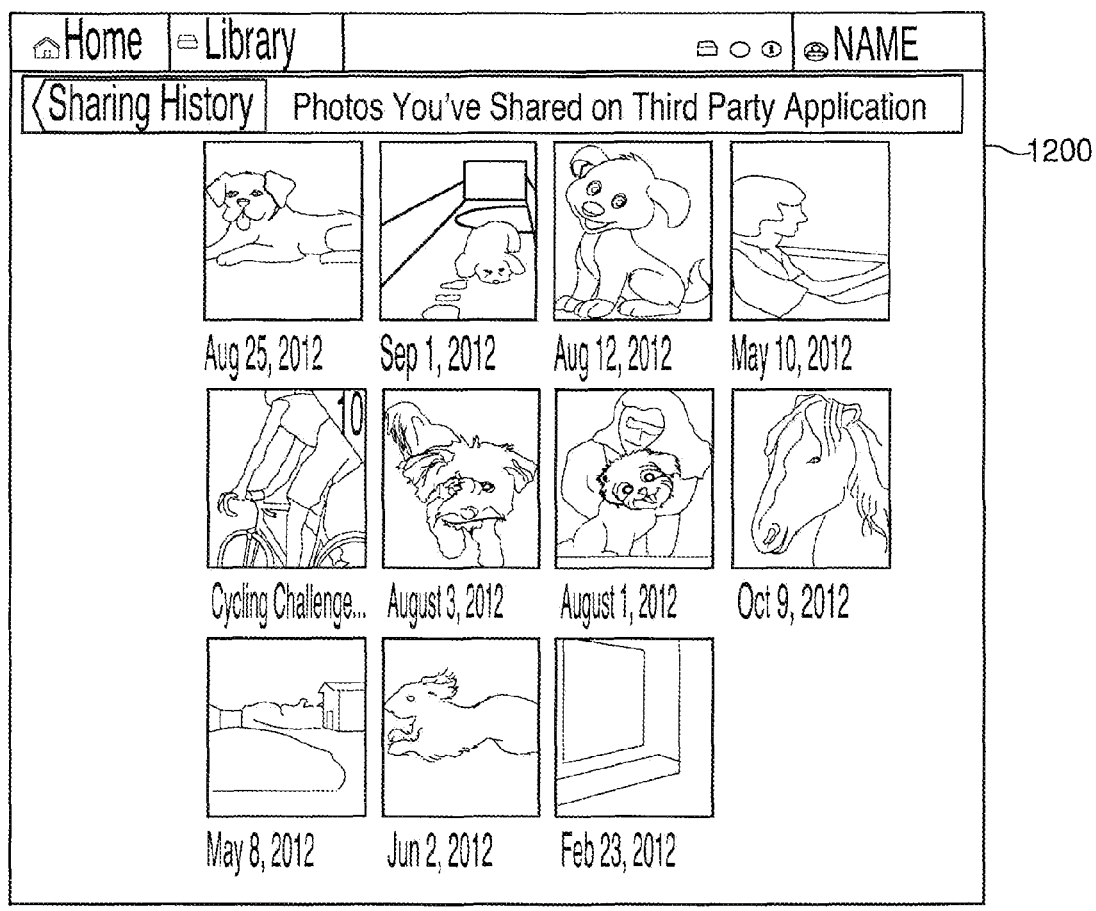
FIG. 12 illustrates an exemplary user interface for managing shared content items with a content management system in accordance with some embodiments of the invention.

FIG. 12 illustrates an exemplary user interface for sharing content items with a content management system in accordance with some embodiments of the invention. As illustrated in user interface 1200, a user may select a particular third party application (e.g., by selecting link 1010 on user interface 1000) to view photos shared with a third party application. In some embodiments, lightweight shares or albums shared with third party applications are actually a link to a web page with content items displayed. The user may require that the recipient that accesses the link be authenticated by using an authenticated account. Alternatively, the user can make the link publicly accessible and restrict the user from copying the images from the content share. Similarly, the user can modify access rights to the content and remove content items shared.

Figure 13:
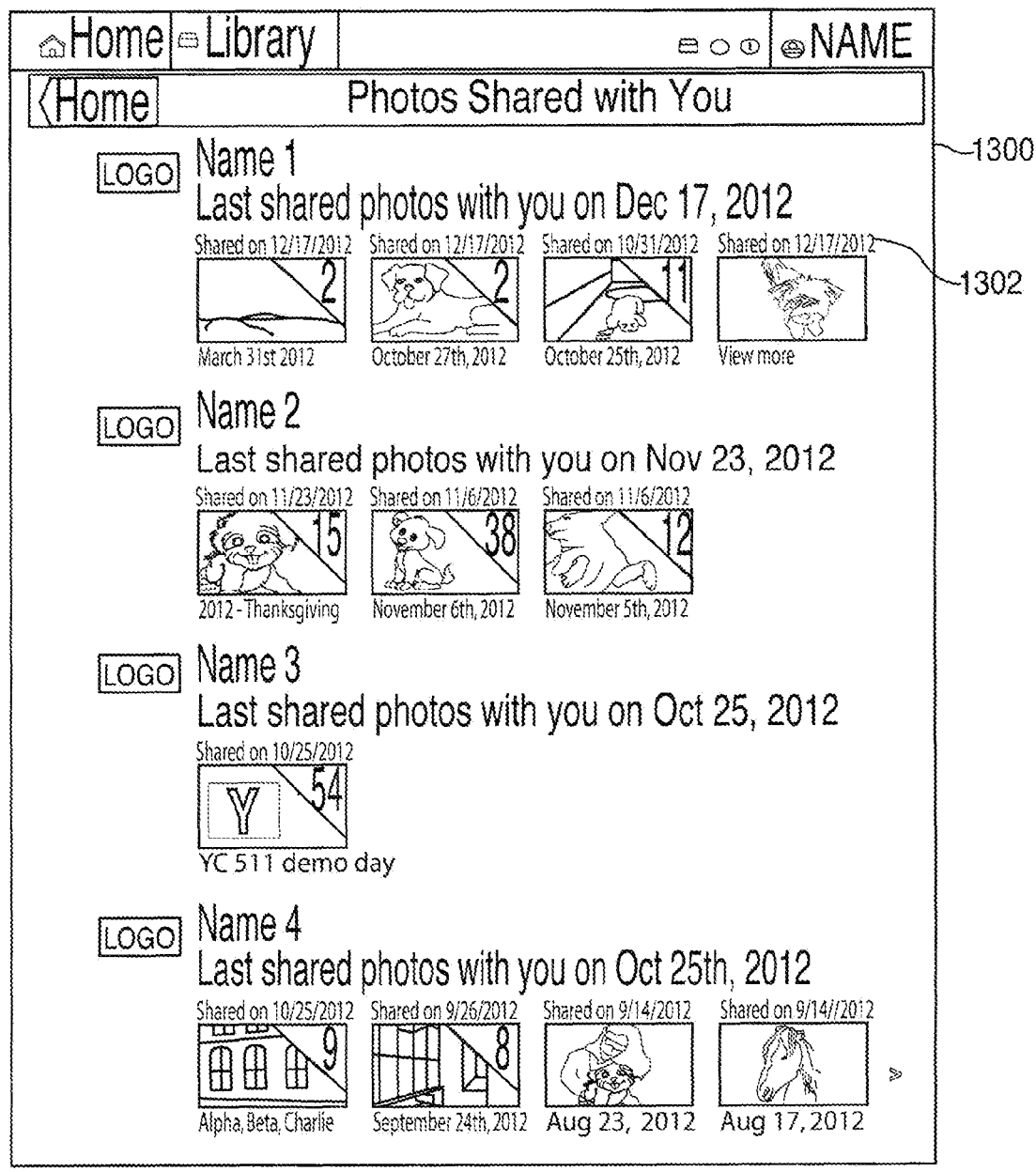
FIG. 13 illustrates an exemplary user interface for managing shared content items with a content management system in accordance with some embodiments of the invention.

FIG. 13 illustrates an exemplary user interface for sharing content items with a content management system in accordance with some embodiments of the invention. As illustrated in user interface 1300, sharing history of what has been shared with a user may be displayed. Each content share may be displayed with a timestamp (e.g., 1302) indicating when the content share was created, available for access, and/or will be available for access by the user.

Any suitable programming language can be used to implement the routines of particular embodiments including C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for organization and presentation of photos thereof, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A method, comprising:
receiving, by a content management system from a first device, a collection of content items to be synchronized by the content management system with the first device;
receiving, by the content management system from the first device, an indication that the collection of content items is to be shared with a first recipient;
receiving, by the content management system from the first device, indicia of a modification to at least one of the content items;
synchronizing the received collection of content items to reflect the received indicia of the modification;
receiving, by the content management system from the first recipient, a request for the collection of content items;
providing, by the content management system in response to the request, the synchronized collection of content items to the first recipient;
receiving, by the content management system, a first request for a history of all content items shared by a user account associated with the first device;
accessing, by the content management system in response to the first request, the history of all content items shared by the user account; and
displaying, in response to the first request, indicia of the history.

2. The method of claim 1, wherein the history of all content items comprises, for each shared collection of content items, at least one of: a sharer field, a shared item, a recipient field, an active flag, a viewed flag, and a timestamp.

3. The method of claim 2, wherein the shared collection comprises at least one of an album and a lightweight share of content items.

4. The method of claim 2, wherein the recipient field for a shared collection of content items comprises an indication of whether a recipient of the shared collection received the shared collection via at least one of (i) a public content share to a third party application, (ii) a private content share to at least one specified recipient, and (iii) a link sent to a web-accessible address.

5. The method of claim 2, wherein:
the sharer field indicates whether the user account was a sharer of the shared item; and
the recipient field indicates whether the user account was a recipient of the shared item.

6. The method of claim 1, wherein the history comprises at least one shared collection of content items, the method further comprising:
modifying at least one of: a time of activation of the at least one shared collection, a validity time interval for the at least one shared collection, and an expiration time of the at least one shared collection.

7. The method of claim 1, wherein
the displayed indicia includes, for each shared content item, an indicator for indicating whether the content item has been viewed.

8. The method of claim 1, wherein the history includes content items shared by the user account and at least one additional user.

9. The method of claim 1 further comprising:
receiving, by the content management system from the first device, a modification to the sharing of the collection of content items with the first recipient;
receiving, by the content management system, a second request for a history of all content items shared by the user account associated with the first device;
accessing, by the content management system in response to the second request, the history of all content items shared by the user account; and
displaying, in response to the second request, indicia of the history, including indicia of the modification to the sharing.

10. The method of claim 9, wherein
the indicia displayed in response to the second request includes a future access date for at least one shared content item.

11. The method of claim 9, wherein
the modification to the sharing includes denying access by the first device to at least one shared content item.

12. A non-transitory computer readable medium containing instructions that, when executed by at least one processor of a computing device, cause the computing device to:
receive from a first device a collection of content items to be synchronized by the content management system with the first device;
receive from the first device an indication that the collection of content items is to be shared with a first recipient;
receive from the first device indicia of a modification to at least one of the content items;
synchronize the received collection of content items to reflect the received indicia of the modification;
receive from the first recipient a request for the collection of content items;
provide in response to the request the synchronized collection of content items to the first recipient;
receive a first request for a history of all content items shared by a user account associated with the first device;
access, in response to the first request, the history of all content items shared by the user account;
display, in response to the first request, indicia of the history.

13. The non-transitory computer readable medium of claim 12, wherein the history of all content items comprises, for each shared collection of content items, at least one of: a sharer field, a shared item, a recipient field, an active flag, a viewed flag, and a timestamp.

14. The non-transitory computer readable medium of claim 13, wherein the shared collection comprises at least one of an album and a lightweight share of content items.

15. The non-transitory computer readable medium of claim 13, wherein the recipient field for shared collection of content items comprises an indication of whether a recipient of the shared collection received the shared collection via at least one of (i) a public content share to a third party application, (ii) a private content share to at least one specified recipient, and (iii) a link sent to a web-accessible address.

16. The non-transitory computer readable medium of claim 12, wherein the history comprises at least one shared collection of content items, when executed by the at least one processor of the computing device, further causes the computing device to:
modify at least one of a: time of activation of the at least one shared collection, a validity time interval for the at least one shared collection, and an expiration time of the at least one shared collection.

17. The non-transitory computer readable medium of claim 12, wherein the executed instructions further cause the processor to:
receive from the first device a modification to the sharing of the collection of content items with the first recipient;
receive a second request for a history of all content items shared by the user account associated with the first device;
access, in response to the second request, the history of all content items shared by the user account; and
display, in response to the second request, indicia of the history, including indicia of the modification to the sharing.

18. A system, comprising:
a processor;
a memory coupled to the processor;
a content management system, executed by the processor, for:
receiving from a first device a collection of content items to be synchronized by the content management system with the first device;
receiving from the first device an indication that the collection of content items is to be shared with a first recipient;
receiving from the first device, indicia of a modification to at least one of the content items;
synchronizing the received collection of content items to reflect the received indicia of the modification;
receiving from the first recipient, a request for the collection of content items;
providing, in response to the request, the synchronized collection of content items to the first recipient;
receiving a first request for a history of all content items shared by a user account associated with the first device;

accessing, in response to the first request, the history of all content items shared by the user account; and displaying, in response to the first request, indicia of the history.

* * * * *